(12) United States Patent
Takahashi et al.

(10) Patent No.: US 12,078,543 B2
(45) Date of Patent: Sep. 3, 2024

(54) COLOR CHART PROVIDED WITH PATCH AND MARKER FOR RECOGNIZING PATCH

(71) Applicant: DIC Corporation, Tokyo (JP)

(72) Inventors: Masato Takahashi, Tokyo (JP); Yasuhiro Morihara, Tokyo (JP); Norimichi Tsumura, Chiba (JP); Ryo Takahashi, Chiba (JP); Keiko Ogawa, Ishikawa (JP); Isseki Kin, Tokyo (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/010,596

(22) PCT Filed: Jun. 15, 2021

(86) PCT No.: PCT/JP2021/022641
§ 371 (c)(1),
(2) Date: Dec. 15, 2022

(87) PCT Pub. No.: WO2021/256458
PCT Pub. Date: Dec. 23, 2021

(65) Prior Publication Data
US 2023/0258501 A1  Aug. 17, 2023

(30) Foreign Application Priority Data

Jun. 17, 2020 (JP) .................................. 2020-104762
Mar. 11, 2021 (JP) .................................. 2021-039110

(51) Int. Cl.
*G01J 3/52* (2006.01)
*H04N 1/60* (2006.01)

(52) U.S. Cl.
CPC .............. *G01J 3/52* (2013.01); *H04N 1/6019* (2013.01)

(58) Field of Classification Search
CPC .............................. G01J 3/52; H04N 1/00045
(Continued)

(56) References Cited

U.S. PATENT DOCUMENTS 7,006,246 B1 * 2/2006 Nakajima .......... H04N 1/00002
358/1.9
2014/0209682 A1 7/2014 Gottwals et al.
(Continued)

FOREIGN PATENT DOCUMENTS

EP           0580365 A1   1/1994
JP           H06-46448 A  2/1994
(Continued)

OTHER PUBLICATIONS

Futa Matsushita et al., "Evaluation of Kampo disease states using facial images", Artificial Life and Robotics, 2019, 24:44-51(8 pages).
(Continued)

Primary Examiner — Jamares Q Washington
(74) Attorney, Agent, or Firm — Osha Bergman Watanabe & Burton LLP

(57) ABSTRACT

When relation between a color of a color chip (a patch) in a color chart and a color of a color chip in an image-captured color chart is calculated, the color chip of the image-captured color chart was manually extracted by operating a keyboard or a mouse. Such an operation had a problem that an extraction error may occur, and that it takes time to manually extract all color chips in the color chart. The present invention solved the problem by a color chart in which recognition can be easily and automatically executed. The color chart includes a plurality of patches, and an automatic recognition marker configured to automatically recognize at least one of the plurality of patches.

7 Claims, 3 Drawing Sheets

(58) Field of Classification Search
USPC ............... 358/1.18, 1.5, 504, 518; 356/421; 382/165
See application file for complete search history.

(56) References Cited

U.S. PATENT DOCUMENTS

2015/0348245 A1    12/2015   Horiuchi et al.
2018/0080829 A1    3/2018   Tanimura et al.
2018/0209852 A1    7/2018   McClanahan et al.

FOREIGN PATENT DOCUMENTS

| JP | 2001260407 A | * | 9/2001 |
| JP | 2018-523818 A | | 8/2018 |
| WO | 2015/005152 A1 | | 1/2015 |
| WO | 2016/163266 A1 | | 10/2016 |

OTHER PUBLICATIONS

Extended European Search Report issued in corresponding European application No. 21826845.6 mailed Jun. 7, 2024 (9 pages).

* cited by examiner

COLOR CHART PROVIDED WITH PATCH AND MARKER FOR RECOGNIZING PATCH

TECHNICAL FIELD

The present invention relates to a color chart.

BACKGROUND ART

A color chart is a plate-shaped object in which color samples are arranged, and is used for comparison and measurement of colors such as checking a color reproducibility of an image system.

The color chart may be used for color correction for a digital image captured by a digital camera or the like.

For example, a technology has been proposed in which an image of a color chart (a color sample) is also captured together when an image of a subject is captured, and a pixel value in the color chart included in the obtained digital image is used to execute the color correction for the digital image (for example, see PTL 1).

CITATION LIST

Patent Literature

PTL 1: JP-A-6-46448

SUMMARY OF INVENTION

Technical Problem

In the technology proposed in PTL 1, when relation between a color of a color chip (a patch) of a color chart and a color of a color chip of an image-captured color chart is calculated, the color chip of the image-captured color chart is manually extracted by operating a keyboard or a mouse (paragraphs [0020] and [0021] of PTL 1). Such an operation has a problem that an extraction error may occur, and it takes time to manually extract all color chips in the color chart.

Therefore, there is a demand for a technology that can easily and automatically recognize the patch in the color chart.

That is, an object of the present invention is to provide a color chart in which the patch in the color chart can be easily and automatically recognized.

Solution to Problem

As a result of intensive studies to solve the above problem, the present inventors have found that a patch can be easily and automatically recognized from a color chart by providing a marker on the color chart, and completed the present invention.

That is, the present invention includes the following aspects.

[1] A color chart including: a plurality of patches; and an automatic recognition marker configured to automatically recognize at least one of the plurality of patches.

[2] In the color chart according to [1], two or more of the automatic recognition markers having different patterns are provided.

[3] In the color chart according to [1] or [2], the plurality of patches include at least three patches selected from the group consisting of the following first patch to seventh patch:

a first patch: a region that has a first color represented by a $L^*a^*b^*$ value in which $L^*=72$, $a^*=8$, and $b^*=22$ or has a color having a color difference $\Delta E^*$ of 5 or less in a $L^*a^*b^*$ color space with respect to the first color;

a second patch: a region that has a second color represented by a $L^*a^*b^*$ value in which $L^*=78$, $a^*=30$, and $b^*=15$ or has a color having the color difference $\Delta E^*$ of 5 or less in the $L^*a^*b^*$ color space with respect to the second color;

a third patch: a region that has a third color represented by a $L^*a^*b^*$ value in which $L^*=58$, $a^*=27$, and $b^*=7$ or has a color having the color difference $\Delta E^*$ of 5 or less in the $L^*a^*b^*$ color space with respect to the third color;

a fourth patch: a region that has a fourth color represented by a $L^*a^*b^*$ value in which $L^*=60$, $a^*=20$, and $b^*=5$ or has a color having the color difference $\Delta E^*$ of 5 or less in the $L^*a^*b^*$ color space with respect to the fourth color;

a fifth patch: a region that has a fifth color represented by a $L^*a^*b^*$ value in which $L^*=48$, $a^*=25$, and $b^*=2$ or has a color having the color difference $\Delta E^*$ of 5 or less in the $L^*a^*b^*$ color space with respect to the fifth color;

a sixth patch: a region that has a sixth color represented by a $L^*a^*b^*$ value in which $L^*=52$, $a^*=50$, and $b^*=13$ or has a color having the color difference $\Delta E^*$ of 5 or less in the $L^*a^*b^*$ color space with respect to the sixth color; and a seventh patch: a region that has a seventh color represented by a $L^*a^*b^*$ value in which $L^*=33$, $a^*=40$, and $b^*=30$ or has a color having the color difference $\Delta E^*$ of 5 or less in the $L^*a^*b^*$ color space with respect to the seventh color.

[4] In the color chart according to any one of [1] to [3], the plurality of patches include a plurality of achromatic color patches having different brightnesses.

[5] In the color chart according to [3] or [4], the plurality of patches include a plurality of chromatic color patches whose colors are different from the first color to the seventh color.

[6] In the color chart according to any one of [1] to [5], an area is 40 $cm^2$ or more and 150 $cm^2$ or less.

[7] In the color chart according to any one of [1] to [6], an area of each of the plurality of patches is 0.25 $cm^2$ or more and 4 $cm^2$ or less.

[8] The color chart according to any one of [1] to [7], further including a blank portion at a lower right portion of a main surface.

Advantageous Effects of Invention

According to the present invention, a color chart can be provided in which a patch in the color chart can be easily and automatically recognized.

DESCRIPTION OF EMBODIMENTS

Figure 1:
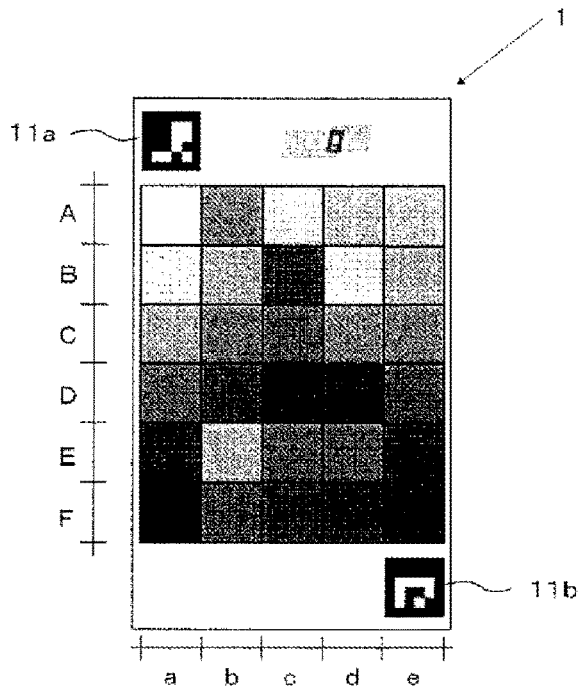
FIG. 1 is a schematic diagram of an example of a color chart.

Hereinafter, a color chart of the present invention will be described in detail. However, the description regarding constituent elements described below is an example of an embodiment of the present invention, and the present invention is not limited to these contents.

<Color Chart>

The color chart according to the present invention includes at least a plurality of patches and an automatic recognition marker.

The plurality of patches include, for example, a plurality of achromatic color patches having different brightnesses. The number of types of the achromatic color patches is, for example, five to seven. If the number of the types of the achromatic color patches is three or less, for example, when color correction for an image obtained by capturing an image of the color chart by a camera is executed using the achromatic color patches, the non-linearity of the camera cannot be sufficiently coped with, and the accuracy of the color correction may decrease. In this regard, the number of the types of the achromatic color patches is preferably five or more.

The plurality of patches include, for example, a plurality of chromatic color patches. The plurality of patches include, for example, a plurality of chromatic color patches whose colors are different from a first color to a seventh color to be described later. The number of types of these chromatic color patches is, for example, 15 to 20.

The size of each patch in the color chart is not particularly limited, and is preferably not too small from a viewpoint of not interfering with color recognition. In this regard, 0.25 $cm^2$ or more is preferable. In addition, from a viewpoint that the color chart is not too large, 4 $cm^2$ or less is preferable.

Examples of the shape of each patch include a square.

The color chart includes an automatic recognition marker that automatically recognizes at least one of the plurality of patches. The color chart includes the automatic recognition marker, so that it is possible to automatically execute an operation of recognizing each patch of the color chart in image data when the color correction to be described later is executed.

The shape and the size of the automatic recognition marker are not particularly limited, and are preferably, for example, similar to those of the patch. For example, the size of the automatic recognition marker is preferably 0.25 $cm^2$ or more and 4 $cm^2$ or less. In addition, the automatic recognition marker generally has a pattern that each patch does not have.

It is preferable that the color chart includes two or more automatic recognition markers having different patterns. When two or more automatic recognition markers are used, the automatic recognition for each patch is executed in consideration of relative positional relation between the two or more automatic recognition markers, and thus the automatic recognition performance for each patch is improved.

The automatic recognition marker is not particularly limited as long as the automatic recognition marker is a marker that enables the automatic recognition, and information such as version information of the color chart, a link to a use method, and an expiration date may be added to the automatic recognition marker by a two-dimensional barcode or the like. Further, the color chart may fade depending on a storage condition. In that respect, it may be preferable to set an expiration date for the color chart.

Here, an example of a method for automatically recognizing each patch of the color chart using the automatic recognition marker will be described.

First, the automatic recognition marker is detected from an image obtained by capturing an image of the color chart. The automatic recognition marker can be detected using, for example, an image recognition device including general-purpose image recognition processing software. Specifically, pattern matching between an image of the automatic recognition marker stored in advance in the image recognition device and the image obtained by capturing an image of the color chart is executed using the image recognition device. Accordingly, the automatic recognition marker is detected from the image obtained by capturing an image of the color chart.

On the other hand, positional relation between the automatic recognition marker and each patch in the color chart is stored in advance in the image recognition device. For example, when two automatic recognition markers having different patterns are used, positional relation between each of the two automatic recognition markers and each patch is stored in advance in a storage unit of the image recognition device. Here, examples of the image recognition device include a combination of a CPU and a memory.

Then, by applying the grasped positional relation to the color chart in the captured image, each patch of the color chart in the captured image can be automatically recognized using the detected automatic recognition marker.

The size of the color chart is not particularly limited, and from a viewpoint that the color chart can be held by one hand and the color chart does not become an obstacle even when the color chart is held near a face, the area of the color chart is preferably 40 $cm^2$ or more and 150 $cm^2$ or less.

The color chart is generally a sheet-shaped color chart. Further, the shape of a main surface of the color chart is, for example, a rectangle.

A material of the color chart is not particularly limited as long as each patch can be printed. For example, the color chart may be made of plastic resin (for example, synthetic paper) or may be made of paper.

The color chart preferably includes a blank portion at a lower right portion (a lower left portion when viewed from the front) of the main surface. Most humans are right-handed. Therefore, when the blank portion of the color chart is held by a right hand, it is easy to naturally place the color chart on a right side of the face.

By the way, a market related to remote medical care is growing, and one of factors is chronic disease treatment, mobile health applications, or the like. Due to the spread of novel coronavirus infection (COVID-19), the importance of the remote diagnosis and treatment is recognized also from a viewpoint of prevention of infection, and it is necessary to construct a good remote diagnosis and treatment system.

In diagnosis and treatment such as observation of a color of a gum in the dentistry, observation of a color of the skin in the dermatology, observation of a color of a throat in the otorhinolaryngology, and examination (inspection) based on a skin color of the face, a tongue color, or the like, which is performed in Chinese medicine, diagnosis and treatment that emphasizes a color may be executed. In such diagnosis and treatment, inaccurate color recognition may affect the diagnosis and treatment.

Therefore, when such diagnosis and treatment is performed in a manner of the remote diagnosis and treatment, it is important to accurately recognize the color.

The color chart according to the present invention preferably includes at least two patches, more preferably includes at least three patches, even more preferably includes at least five patches, and particularly preferably includes seven patches. The patches are selected from the group consisting of the following first patch to seventh patch. When the color chart includes at least two patches selected from the group consisting of the following first patch to seventh patch, the color chart assists in accurately recognizing the color such as the skin color and the tongue color in the remote diagnosis and treatment, and therefore, the color chart is useful for the remote diagnosis and treatment using color information such as the skin color and the tongue color of a patient.

A combination of the first patch to the seventh patch is not particularly limited as long as the combination is a combination of two or more patches selected from the seven patches, and it is preferable to select three or more patches having different color tones such as purplish-red, pale red-purple, and deep yellow-red.

A first patch: a region that has a first color represented by an L*a*b* value in which L*=72, a*=8, and b*=22 or that has a color having a color difference ΔE* of 5 or less in an L*a*b* color space with respect to the first color A second patch: a region that has a second color represented by an L*a*b* value in which L*=78, a*=30, and b*=15 or that has a color having the color difference ΔE* of 5 or less in the L*a*b* color space with respect to the second color A third patch: a region that has a third color represented by an L*a*b* value in which L*=58, a*=27, and b*=7 or that has a color having the color difference ΔE* of 5 or less in the L*a*b* color space with respect to the third color A fourth patch: a region that has a fourth color represented by an L*a*b* value in which L*=60, a*=20, and b*=5 or that has a color having the color difference ΔE* of 5 or less in the L*a*b* color space with respect to the fourth color A fifth patch: a region that has a fifth color represented by an L*a*b* value in which L*=48, a*=25, and b*=2 or that has a color having the color difference ΔE* of 5 or less in the L*a*b* color space with respect to the fifth color A sixth patch: a region that has a sixth color represented by an L*a*b* value in which L*=52, a*=50, and b*=13 or that has a color having the color difference ΔE* of 5 or less in the L*a*b* color space with respect to the sixth color A seventh patch: a region that has a seventh color represented by an L*a*b* value in which L*=33, a*=40, and b*=30 or that has a color having the color difference ΔE* of 5 or less in the L*a*b* color space with respect to the seventh color The color of the first patch corresponds to a color of tongue coating formed due to accumulation of moisture (excess water).

The color of the second patch corresponds to an inflammatory skin color.

The color of the third patch corresponds to a color of a tongue having blood stasis (poor microcirculation).

The color of the fourth patch corresponds to a color of a certain portion of healthy tongue coating.

The color of the fifth patch corresponds to a color of deep lingual vein in an engorgement=blood stasis state.

The color of the sixth patch corresponds to a color of a healthy tongue.

The color of the seventh patch corresponds to a color of a tongue having heat.

By using the color chart having these colors, it is possible to easily perform the diagnosis and treatment using the color information such as the skin color and the tongue color of the patient.

Here, an example of the color chart will be described with reference to drawings.

FIG. 1 is a schematic diagram of an example of the color chart.

In addition, the color chart in FIG. 1 is a gray scale, but an actual color chart includes a chromatic color patch.

The color chart in FIG. 1 is a rectangle having a length of about 90 mm and a width of about 55 mm. Automatic recognition markers 11a and 11b of 10 mm square are disposed on an upper right portion (an upper left portion when viewed from the front) at an upper side and a lower left portion (a lower right portion when viewed from the front) at a lower side of a main surface of the color chart. The two automatic recognition markers 11a and 11b have white patterns on black backgrounds. The white pattern of the automatic recognition marker 11a is different from the white pattern of the automatic recognition marker 11b. In a central portion sandwiched between the upper side and the lower side, patches of 10 mm square are arranged without being spaced apart in 6 (A to F) rows and 5 (a to e) columns. In a rightmost column (a first column: leftmost column when viewed from the front) of the main surface, achromatic color patches are arranged in order of brightness.

L*a*b* values of the patches of the color chart shown in FIG. 1 are shown in Table 1-1. In addition, outlines of colors of the patches of the color chart shown in FIG. 1 are shown in Table 1-2. In addition, relation between the first patch to the seventh patch and the skin color and the tongue color is shown in Table 1-3.

TABLE 1-1

|   | a |   |   | b |   |   | c |   |   | d |   |   | e |   |   |
|---|---|---|---|---|---|---|---|---|---|---|---|---|---|---|---|
|   | L* | a* | b* | L* | a* | b* | L* | a* | b* | L* | a* | b* | L* | a* | b* |
| A | 97 | 0 | 0 | 62 | 38 | 55 | 82 | 6 | 74 | 72 | 22 | 62 | 72 | 8 | 22 |
| B | 87 | 0 | 0 | 70 | −30 | −4 | 51 | −21 | −30 | 78 | 30 | 15 | 67 | 20 | 14 |
| C | 76 | 0 | 0 | 55 | 14 | −30 | 51 | 0 | −25 | 60 | 20 | 5 | 58 | 27 | 7 |
| D | 64 | 0 | 0 | 40 | 14 | −47 | 28 | 24 | −55 | 30 | 27 | −26 | 48 | 25 | 2 |
| E | 51 | 0 | 0 | 73 | −22 | 54 | 50 | 54 | −18 | 52 | 50 | 13 | 42 | 57 | 24 |
| F | 36 | 0 | 0 | 56 | −37 | 30 | 43 | −12 | 18 | 38 | 17 | 12 | 33 | 40 | 30 |

TABLE 1-2

|   | a | b | c | d | e |
|---|---|---|---|---|---|
| A | White | Orange | Yellow | Pale orange | Dull yellow-red (first patch) |
| B | Fairly pale gray | Light grey-green | Sky-blue | Pale red (second patch) | Pale yellowish red |
| C | Pale gray | Purple | Grey-blue | Purple-red (fourth patch) | Purple-red (third patch) |
| D | Gray | Purple-blue | Navy blue | Purple | Dull purple-red (fifth patch) |
| E | Deep gray | Yellow-green | Pink | Light red (sixth patch) | Red |
| F | Black | Green | Dark yellow-green | Dark yellow-red | Deep yellow-red (seventh patch) |

TABLE 1-3

|   | a | b | c | d | e |
|---|---|---|---|---|---|
| A | | | | | Color of tongue coating formed due to accumulation of moisture (excess water) (first patch) |
| B | | | | Inflammatory skin color (second patch) | |
| C | | | | Color of certain portion of healthy tongue coating (fourth patch) | Color of tongue having blood stasis (poor microcirculation) (third patch) |
| D | | | | | Color of deep lingual vein in engorgement = blood stasis state (fifth patch) |
| E | | | | Color of healthy tongue (sixth patch) | |
| F | | | | | Color of tongue having heat (seventh patch) |

Hereinafter, an example of an image display system and an example of an image display method, which use the color chart according to the present invention, will be described.
(Image Display System and Image Display Method)

The image display system according to the present invention includes at least the color chart, an image capturing device, and a display device, and further includes other devices as necessary.

The image display method according to the present invention includes at least an image capturing step and a display step, and further includes other steps as necessary.

Figure 2:
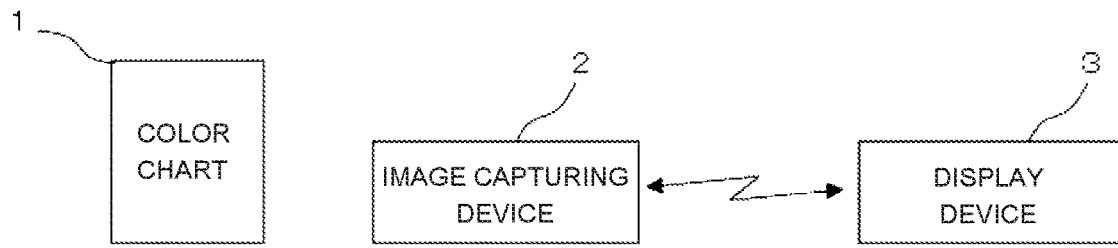
FIG. 2 is a configuration diagram of an example of an image display system.

FIG. 2 is a configuration diagram of an example of the image display system. The image display system in FIG. 2 includes a color chart 1, an image capturing device 2, and a display device 3.
<Image Capturing Device and Image Capturing Step>

The image capturing device is a device that simultaneously captures an image of the color chart and a subject to be image-captured and that acquires image data.

In the image capturing step, the image of the color chart and the subject to be image-captured is captured simultaneously, and the image data is acquired.

The image capturing step is executed by, for example, the image capturing device.

The subject to be image-captured is, for example, a patient who receives the remote diagnosis and treatment.

Examples of the image capturing device include a camera and an electronic device having a camera function.

Examples of the electronic device having a camera function include a mobile phone, a smartphone, a tablet terminal, a personal computer, a monitoring camera, and a camera system (for example, a camera system attached to an f-MRI) attached to a medical examination apparatus. In addition, a camera in the personal computer serving as the image capturing device may be a built-in camera or an external camera.

Examples of an image capturing element provided in the image capturing device include a charge coupled device (CCD) and a complementary metal oxide semiconductor (CMOS).

It is preferable that the image capturing device includes a transmission unit that transmits the image data.

The transmission of the image data by the transmission unit may be executed by wireless communication, or may be executed by wired communication.

As the wireless transmission, for example, wireless communication of any available type such as Wi-Fi, LTE, and 5G can be used.

The captured image may be a still image or a moving image.
<Display Device and Display Step>

The display device is a device that receives the image data and that displays the image data on a display unit as an image. The display device includes at least a display unit, and further includes other units such as a color correction unit as necessary.

In the display step, the image data is received, and the image data is displayed on the display unit as the image.

In the display step, a color correction process may be also executed.

The display step is executed by, for example, the display device.

Figure 3:
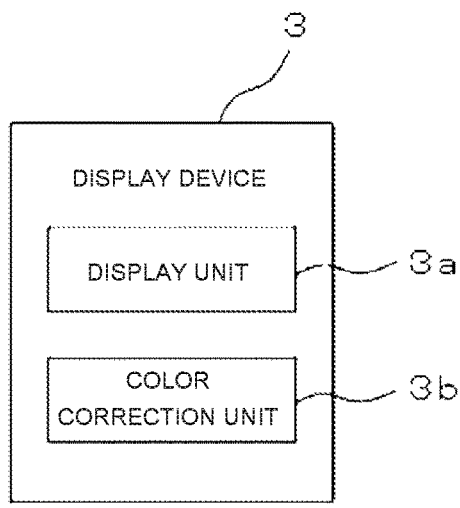
FIG. 3 is a functional configuration diagram of an example of a display device.

FIG. 3 illustrates a functional configuration diagram of an example of the display device. The display device 3 in FIG. 3 includes a display unit 3a and a color correction unit 3b.

The display device includes, for example, a reception unit that receives the image data.

For example, the image data is transmitted from the image capturing device and received by the display device. The image data is generally transmitted and received through an Internet line.

A file format of the image data is not particularly limited, and may be any available format. For example, examples of the file format of the image data include JPG (JPEG), GIF, PNG, and BMP when the image data is the still image, and include AVI, QuickTime, Mpeg-1, Mpeg-2, WMV, FLV, and MPEG-4 when the image data is the moving image.

The image data can be transmitted and received using, for example, a communication service such as an E-mail and a social networking service.

In addition, when the image data is the moving image, for example, a web conference system such as Skype, Zoom, and Microsoft Teams may be used for the transmission and reception. In addition to the image data, voice data may be transmitted and received.

A method for transmitting the image data from the image capturing device to the display device may include uploading of the image data from the image capturing device to a cloud server and downloading of the image data from the cloud server to the display device. The uploading and the downloading are executed using a cloud. That is, the display device may receive the image data from the cloud server.

In addition, the method for transmitting the image data from the image capturing device to the display device may be executed by physical movement via an external memory. For example, the display device can receive the image data by storing the image data acquired by the image capturing device in an external memory such as a USB memory, physically moving the external memory by mail or the like, and then connecting the external memory to the display device.

Further, by storing the image data received a plurality of times in the display device, it is also possible to check a change over time of the subject to be image-captured using the image data.

The display device is not particularly limited, and examples thereof include output terminals of the mobile phone, the smartphone, the tablet terminal, the personal computer, and an electronic medical record system.

The display device is not particularly limited, and examples thereof include the mobile phone, the smartphone, the tablet terminal, and the personal computer.

<<Color Correction Unit and Color Correction Process>>

The color correction unit is a unit that corrects a display color of the display unit and color information of the image data such that a color of at least one patch in a color chart in the image displayed on the display unit approaches or matches a color of at least one corresponding patch in a color chart measured under a light source at a place where the display unit is placed.

In the color correction process, the display color of the display unit and the color information of the image data are corrected such that the color of at least one patch in the color chart in the image displayed on the display unit approaches or matches the color of at least one corresponding patch in the color chart measured under the light source at the place where the display unit is placed.

The color correction process is executed by, for example, the color correction unit.

The color correction unit is, for example, a CPU that executes a program for executing the color correction.

Here, the degree to which the colors are brought close to each other by the color correction may be appropriately selected according to a purpose.

Such color correction may be executed using only one of the patches in the color chart, or may be executed using a plurality of patches.

The color correction unit includes, for example, a first correction unit and a second correction unit.

The first correction unit is a unit that corrects the display color of the display unit such that a corresponding display color of the display unit approaches or matches the color of at least one patch in the color chart measured under the light source at the place where the display unit is placed.

The second correction unit is a unit that corrects the color information of the image data such that a color of at least one corresponding patch in the color chart in the image data approaches or matches the color of at least one patch in the color chart measured under the light source at the place where the display unit is placed.

The color correction process includes, for example, a first correction process and a second correction process.

In the first correction process, the display color of the display unit is corrected such that the corresponding display color of the display unit approaches or matches the color of at least one patch in the color chart measured under the light source at the place where the display unit is placed.

In the second correction process, the color information of the image data is corrected such that the color of at least one corresponding patch in the color chart in the image data approaches or matches the color of at least one patch in the color chart measured under the light source at the place where the display unit is placed.

The first correction process is executed by, for example, the first correction unit.

The second correction process is executed by, for example, the second correction unit.

When an image of the color chart and the subject to be image-captured is captured simultaneously, the color information (for example, RGB values) in the obtained image data differs due to a difference in image capturing environment, a difference in type of the image capturing device, or the like.

Examples of the difference in image capturing environment include a difference in type of a light source for lighting and a difference in brightness of the lighting in a case of image capturing in a room. In addition, a difference in positional relation between the light source and the target to be image-captured (the color chart and the subject to be image-captured) also affects the color information in the obtained image data.

Examples of the difference in type of the image capturing device include a difference in type of the image capturing element and a difference in image processing engine. The image processing engine is, for example, a system LSI that processes a raw image output from the image capturing element and that converts the raw image into an image suitable for the humans to observe. The system LSI, which is the image processing engine, is implemented by, for example, an embedded CPU, an embedded DSP, a dedicated arithmetic circuit that executes face detection and the like, a program memory, a data memory, and an image memory.

For example, when an image of the color chart is captured, the color information of the patch in the color chart may differ for each obtained image data due to a difference in type of the smartphone serving as the image capturing device, a difference in type of an indoor lighting, or the like. Therefore, the colors of the patch in the color chart in the images may be different from each other also when the images are displayed on the same display unit. This difference may affect the remote diagnosis and treatment.

In addition, a color of the patch of the color chart recognized by a person when a color chart is observed depends on environment (for example, the light source) in which the color is observed. This is because spectral distribution of light illuminating the color chart depends on the light source. Therefore, when the light sources are different, the colors of the patch in the color chart recognized or measured when the color chart is observed are different. Therefore, even if the RGB value of the color of the patch in the color chart is accurately displayed on the display unit, the color of the patch in the color chart displayed on the display unit may be different from the color of the patch in the color chart recognized by the person under the light source at the place where the display unit is placed.

Therefore, the color correction unit and the color correction process described above are useful.

Here, a specific example of the color correction in a case in which a doctor performs the remote diagnosis and treatment for the patient using the color chart will be described.

A purpose of the color correction is to match a color of a color chart (a color chart captured together with a patient) in an image displayed on a display unit (for example, a display of a PC) used by the doctor to a color (a color of a color chart recognized by the doctor under a certain light source) of a color chart at hand of the doctor, which is a correct value.

The color correction is executed in an order of color correction (the first correction process) of a display color of the display used by the doctor and color correction (the second correction process) of an image obtained by capturing an image of the patient.

First, an example of the first correction process will be described.

In the first correction process, the display color of the display unit is corrected such that the corresponding display color of the display unit approaches or matches the color of at least one patch in the color chart measured under the light source at the place where the display unit is placed.

Specifically, first, the color of at least one patch in the color chart measured under the light source at the place where the display unit is placed is measured. Then, the display color of the display is corrected to approach or match the measured color.

The person recognizes the color by tristimulus values XYZ. Therefore, XYZ values, which are correct values, are measured and obtained by a colorimeter under the same lighting environment as lighting environment of the doctor. As the colorimeter, for example, a Konica Minolta color luminance meter CS-100A is used.

Correction for the display is specifically executed as follows with reference to the following non patent literature. Matsushita, F., Kiyomitsu, K., Ogawa, K., and Tsumura, N. (2019). Evaluation of Kampo disease states using facial images. Artificial Life and Robotics, 24(1), pp. 44 to 51.

Relation between luminances and input RGB levels is expressed by the following Equation (1).

[Math 1]

$$L^*_R = a_0 R^2 + a_1 R + a_2$$

$$L^*_G = b_0 G^2 + b_1 G + b_2$$

$$L^*_B = c_0 B^2 + c_1 B + c_2 \quad (1)$$

Here, $L^*_R$, $L^*_G$, and $L^*_B$ are luminances of red, green, and blue, respectively, and $a_i$, $b_i$ and $c_i$ (i=0, 1, 2) are coefficients.

Tristimulus values X', Y', and Z' of the display color of the display can be decomposed into contributions of R, G, and B as indicated in the following Equation (2).

[Math 2]

$$\begin{pmatrix} X' \\ Y' \\ Z' \end{pmatrix} = \begin{pmatrix} X'_R + X'_G + X'_B \\ Y'_R + Y'_G + Y'_B \\ Z'_R + Z'_G + Z'_B \end{pmatrix} \quad (2)$$

Here, $X'_i$, $Y'_i$, and $Z'_i$ (i=R, G, B) indicate tristimulus values for red emission, green emission, and blue emission, respectively. The tristimulus values corresponding to the emissions can be calculated based on luminances L and color coordinates x and y when the display is measured. Relation of X-Y and Y-Z for each emission can be expressed by a linear equation such as the following Equation (3).

[Math 3]

$$X'_R = a_R Y'_R + b_R$$

$$X'_G = a_G Y'_G + b_G$$

$$X'_B = a_B Y'_B + b_B$$

$$Z'_R = c_R Y'_R + d_R$$

$$Z'_G = c_G Y'_G + d_G$$

$$Z'_B = c_B Y'_B + d_B \quad (3)$$

Here, $a_i$, $b_i$, $c_i$, and $d_i$ (i=R, G, B) are coefficients.

The following Equation (4) is obtained based on Equations (2) and (3).

[Math 4]

$$\begin{pmatrix} X' \\ Y' \\ Z' \end{pmatrix} = \begin{pmatrix} a_R Y'_R + a_G Y'_G + a_B Y'_B + b_R + b_G + b_B \\ Y'_R + Y'_G + Y'_B \\ c_R Y'_R + c_G Y'_G + c_B Y'_B + d_R + d_G + d_B \end{pmatrix} = \quad (4)$$

$$A \begin{pmatrix} Y'_R \\ Y'_G \\ Y'_B \end{pmatrix} + \begin{pmatrix} b_R + b_G + b_B \\ 0 \\ d_R + d_G + d_B \end{pmatrix}$$

$$A = \begin{pmatrix} a_R & a_G & a_B \\ 1.0 & 1.0 & 1.0 \\ c_R & c_G & c_B \end{pmatrix}$$

Based on Equation (4), luminances of the RGB at the time when certain tristimulus values X'Y'Z' are desired to be displayed on the display can be obtained by Equation (5).

[Math 5]

$$\begin{pmatrix} L'_R \\ L'_G \\ L'_B \end{pmatrix} = \begin{pmatrix} Y'_R \\ Y'_G \\ Y'_B \end{pmatrix} = A^{-1} \begin{pmatrix} X' - b_R - b_G - b_B \\ Y' \\ Z' - d_R - d_C - d_B \end{pmatrix} \quad (5)$$

The XYZ values of the patch in the color chart, which are the correct values measured by the colorimeter under the same lighting environment as the lighting environment of the doctor, are entered into X', Y', and Z' in Equation (5). Then, by applying the luminances obtained by Equation (5) to Equation (1), an RGB value (a reference RGB value) can be calculated. Then, the display color (the RGB value) of the display corresponding to the color (the RGB value) of the patch in the color chart is corrected to the calculated RGB value (the reference RGB value). Accordingly, the display color of the display used by the doctor can be corrected. That is, according to the above procedure, the display color of the display can be corrected to the correct value.

Next, an example of the second correction process will be described.

In the second correction process, the color information of the image data is corrected such that the color of at least one corresponding patch in the color chart in the image data approaches or matches the color of at least one patch in the color chart measured under the light source at the place where the display unit is placed.

Specifically, an RGB value of at least one patch in a color chart in image data of an image obtained by capturing an image of the color chart and the patient is corrected to the corresponding reference RGB value calculated in the first process correction.

More specifically, each patch portion in the color chart is extracted from the captured image using the automatic recognition marker, and an average value of RGB values of pixels in the patch is obtained for each patch. A model is created by multiple regression based on a difference between an averaged number (an RGB value) and the corresponding reference RGB value. Based on the model, all pixels of the image data are converted, and a color of a face, a tongue, or the like of an image-captured person is corrected.

The correction is executed by examining correlation between an RGB value of a patch in a color chart in image data of the image obtained by capturing an image of the patient and the corresponding reference RGB value.

In the correction, first, gamma correction of the image data is executed using achromatic colors in the patches in the color chart of the captured image. Then, the RGB value of the image data is corrected using all chromatic colors in the patches in the color chart.

The gamma correction will be described in detail. First, in the first correction process, based on luminances at the time when achromatic color parts in the patches in the color chart are measured by the colorimeter, the gamma correction is executed on RGB values of the achromatic color parts in the captured image. Similarly, the gamma correction is also executed for a gray scale part of the reference RGB value.

Then, the gamma correction is executed for each of the RGB values. An R value is as illustrated in Equation (6).

[Math 6]

$$R_c = aY^\gamma + b \quad (6)$$

$R_c$ is an R value of the captured image, and Y is a luminance at the time when the achromatic color in the patch in the color chart is measured by the colorimeter. Normalization is executed with a luminance value of white such that black is 0 and white is 1 among the achromatic colors of the color chart. Accordingly, conversion is executed such that the brightness of the achromatic color is in a range of 0 to 1. By this model, the gamma correction is executed for any RGB value. Specifically, an RGB value obtained after the gamma correction is calculated by multiplying each of the RGB values by an inverse function in Equation (6).

Then, a model is constructed by the multiple regression for the color of the patch for which the gamma correction has been executed. An R value is as illustrated in Equation (7).

[Math 7]

$$R'_c = aR_r + bG_r + cB_r + d \quad (7)$$

$R'_c$ is an R value of the corrected image, and $R_r$, $G_r$, and $B_r$ are RGB values before correction. Each parameter (a, b, c, d) is obtained by the multiple regression using the corresponding patch.

An example of the image display method using the image display system will be described with reference to a drawing.

Figure 4:
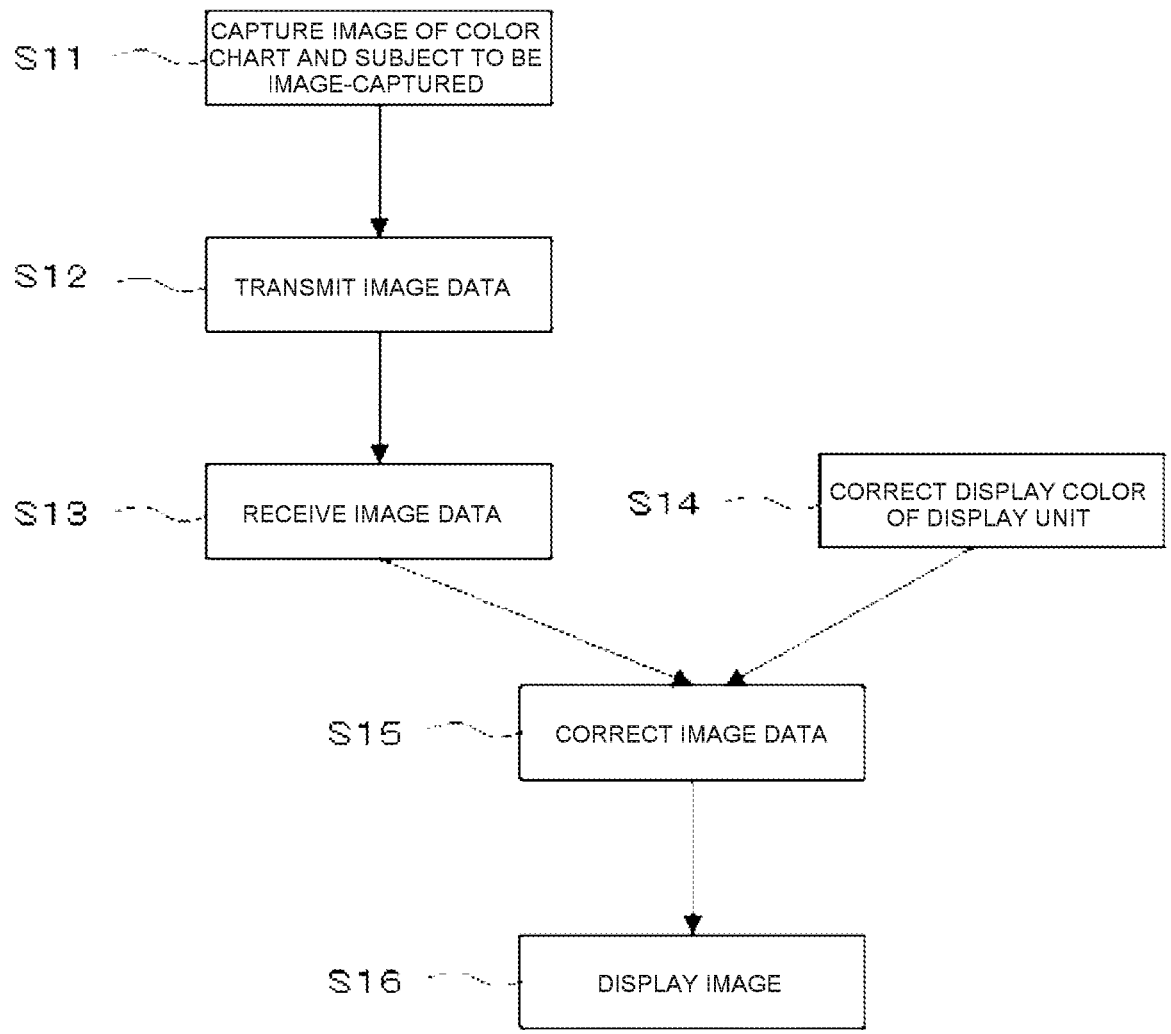
FIG. 4 is a flowchart of an example of an image display method.

FIG. 4 is a flowchart of an example of the image display method.

Figure 5:
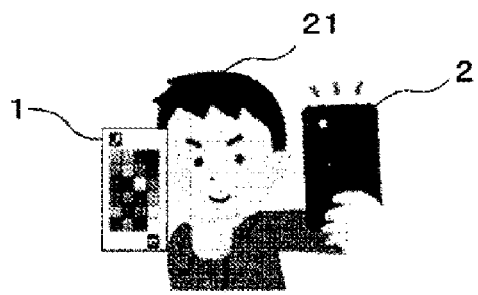
FIG. 5 is a schematic diagram of an example in which an image of the color chart and a patient is captured simultaneously by an image capturing device.

First, as shown in FIG. 5, an image of the color chart 1 and a subject 21 to be image-captured is captured simultaneously using a smartphone that is the image capturing device 2 (S11).

Then, image data obtained by the image capturing is transmitted from the image capturing device 2 to the display device 3 (S12).

Then, the image data transmitted from the image capturing device 2 is received by the display device 3 (S13). The image data is transmitted and received by, for example, being attached to an e-mail.

On the other hand, a display color of the display unit 3*a* is corrected (S14). Specifically, the display color of the display unit is corrected such that the corresponding display color of the display unit approaches or matches the color of at least one patch in the color chart measured under the light source at the place where the display unit is placed. The color correction is executed by the color correction unit 3*b*.

Then, the image data is corrected (S15). Specifically, the color information of the image data is corrected such that the color of at least one corresponding patch in the color chart in the image data approaches or matches the color of at least one patch in the color chart measured under the light source at the place where the display unit is placed (S15). The color correction is executed by the color correction unit 3*b*. When the color correction is executed, each patch in the color chart in the image is automatically recognized using the automatic recognition marker.

Figure 6:
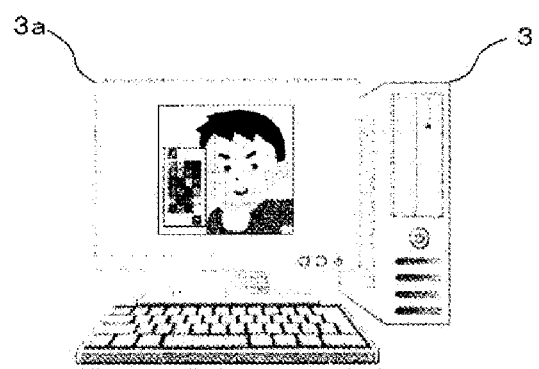
FIG. 6 is a schematic diagram of an example in which a captured image is displayed on a display unit of the display device.

Finally, as illustrated in FIG. 6, the corrected image data is displayed as an image on the display unit 3*a* (the display) of the PC that is the display device 3 (S16).

Accordingly, the example of the image display method is executed. In addition, the step S14 does not need to be executed after the step S13, and the step S14 and other steps may be executed in any order.

Figure 7:
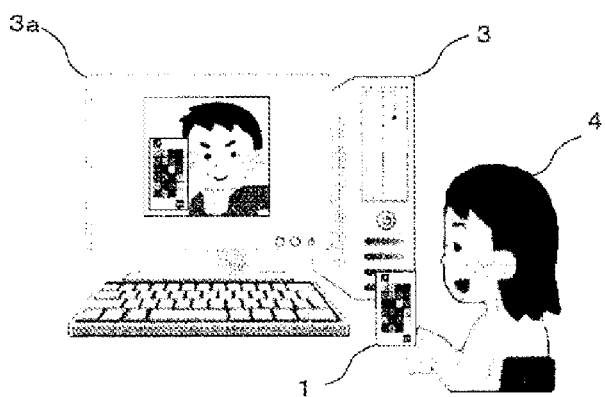
FIG. 7 is a schematic diagram of an example in which a doctor displays the captured image on the display unit of the display device to perform remote diagnosis and treatment.

Further, when remote diagnosis and treatment using the image display method is performed, as illustrated in FIG. 7, a doctor 4, who is a diagnostician, observes a skin color of a face and a tongue color of the patient that are displayed on the display unit 3*a* while holding the same color chart 1 as the color chart 1 held by the patient who is the subject 21 to be image-captured, and performs diagnosis and treatment.

In this example, the color correction is executed, and therefore, as compared with a case in which the color correction is not executed, the skin color of the face of the patient in the image is close to a skin color of the face of the patient at the time when it is assumed that face-to-face diagnosis and treatment is performed. Therefore, when inspecting the skin color and the tongue color of the patient, the doctor can perform the remote diagnosis and treatment in a state close to a state in which the face-to-face diagnosis and treatment is performed.

In addition, the color chart according to the present invention can also be used in a case in which the color correction as described above is not executed. That is, the color chart according to the present invention can also be used in a case in which the remote diagnosis and treatment is performed using the ability (the ability to compare colors and execute the color correction in the brain) of human chromatic adaptation. In this case, for example, the remote diagnosis and treatment may be performed as follows.

While holding the color chart at hand, the doctor causes the personal computer to display an image (an image obtained by simultaneously capturing an image of the color chart and the patient) sent from the patient, and observes the skin color of the face of the patient while viewing the image to perform diagnosis and treatment. At this time, the doctor compares the color of the color chart at hand with the color of the color chart in the image displayed on the personal computer, and observes the skin color of the face of the patient while reflecting, in the brain, a difference between the colors in the color of the patient in the image.

Hereinafter, as a reference example, an implementation result of an example of the image display method using the color chart will be described.

The image was displayed according to the flowchart illustrated in FIG. 4.

As the color chart, the color chart illustrated in FIG. 1 was used.

The color correction of the image was executed by the method described above using Equations (1) to (7).

The program for executing the color correction was created by Python.

As a result, the skin color of the face of the patient in the image displayed on the display unit was the same as the skin color of the face at the time when it was assumed that the face-to-face diagnosis and treatment was performed.

A doctor of Chinese medicine evaluated the image displayed on the display unit. In an evaluation result, an opinion was obtained that color correction within a reliable range was executed in the diagnosis and treatment.

REFERENCE SIGNS LIST

1: Color chart
2: Image capturing device
3: Display device
3a: Display unit
4: Doctor
11a, 11b: Automatic recognition marker
21: Subject to be image-captured

The invention claimed is:

1. A color chart comprising:
a plurality of patches; and
an automatic recognition marker configured to automatically recognize at least one of the plurality of patches, wherein
the plurality of patches include at least three patches selected from the group consisting of:
a first patch: a region that has a first color represented by an $L^*a^*b^*$ value in which $L^*=72$, $a^*=8$, and $b^*=22$ or that has a color having a color difference $\Delta E^*$ of 5 or less in an $L^*a^*b^*$ color space with respect to the first color;
a second patch: a region that has a second color represented by an $L^*a^*b^*$ value in which $L^*=78$, $a^*=30$, and $b^*=15$ or that has a color having the color difference $\Delta E^*$ of 5 or less in the $L^*a^*b^*$ color space with respect to the second color;
a third patch: a region that has a third color represented by an $L^*a^*b^*$ value in which $L^*=58$, $a^*=27$, and $b^*=7$ or that has a color having the color difference $\Delta E^*$ of 5 or less in the $L^*a^*b^*$ color space with respect to the third color;
a fourth patch: a region that has a fourth color represented by an $L^*a^*b^*$ value in which $L^*=60$, $a^*=20$, and $b^*=5$ or that has a color having the color difference $\Delta E^*$ of 5 or less in the $L^*a^*b^*$ color space with respect to the fourth color;
a fifth patch: a region that has a fifth color represented by an $L^*a^*b^*$ value in which $L^*=48$, $a^*=25$, and $b^*=2$ or that has a color having the color difference $\Delta E^*$ of 5 or less in the $L^*a^*b^*$ color space with respect to the fifth color;
a sixth patch: a region that has a sixth color represented by an $L^*a^*b^*$ value in which $L^*=52$, $a^*=50$, and $b^*=13$ or that has a color having the color difference $\Delta E^*$ of 5 or less in the $L^*a^*b^*$ color space with respect to the sixth color; and
a seventh patch: a region that has a seventh color represented by an $L^*a\ b^*$ value in which $L^*=33$, $a^*=40$, and $b^*=30$ or that has a color having the color difference $\Delta E^*$ of 5 or less in the $L^*a^*b^*$ color space with respect to the seventh color.

2. The color chart according to claim 1, wherein two or more of the automatic recognition markers having different patterns are provided.

3. The color chart according to claim 1, wherein the plurality of patches include a plurality of achromatic color patches having different brightnesses.

4. The color chart according to claim 1, wherein the plurality of patches include a plurality of chromatic color patches whose colors are different from the first color to the seventh color.

5. The color chart according to claim 1, wherein an area is 40 cm² or more and 150 cm² or less.

6. The color chart according to claim 1, wherein an area of each of the plurality of patches is 0.25 cm² or more and 4 cm² or less.

7. The color chart according to claim 1, further comprising a blank portion at a lower right portion of a main surface.

* * * * *